April 2, 1957  W. H. HORTON ET AL  2,787,191
STEREOSCOPIC HAND VIEWER
Filed Dec. 8, 1953  3 Sheets-Sheet 1

WILLIAM H. HORTON
CAMERON B. ESTES
INVENTORS

BY
ATTORNEYS

April 2, 1957 W. H. HORTON ET AL 2,787,191
STEREOSCOPIC HAND VIEWER
Filed Dec. 8, 1953 3 Sheets-Sheet 2
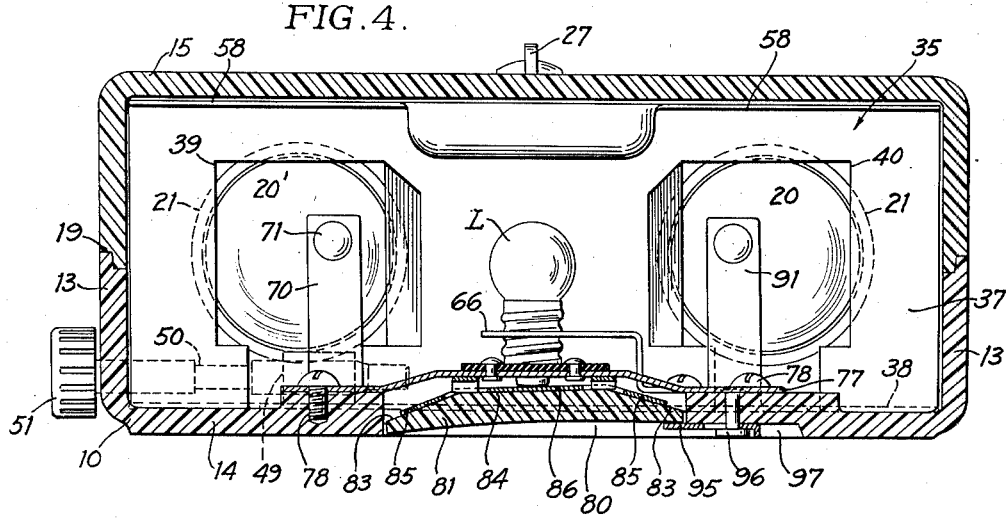
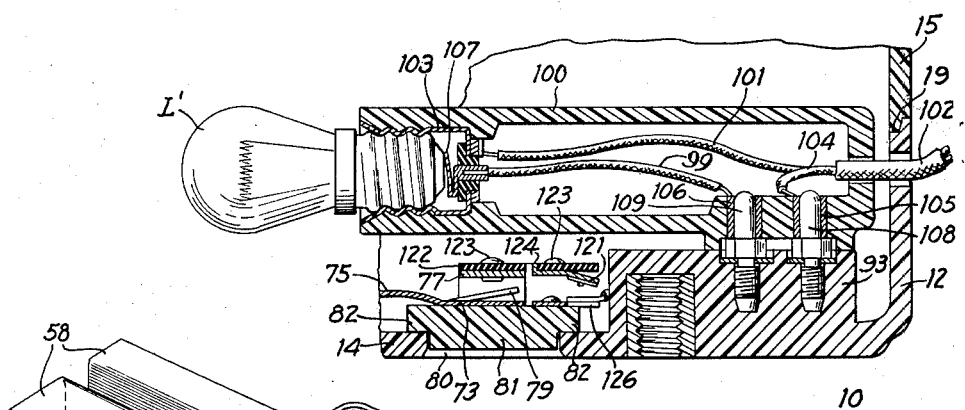
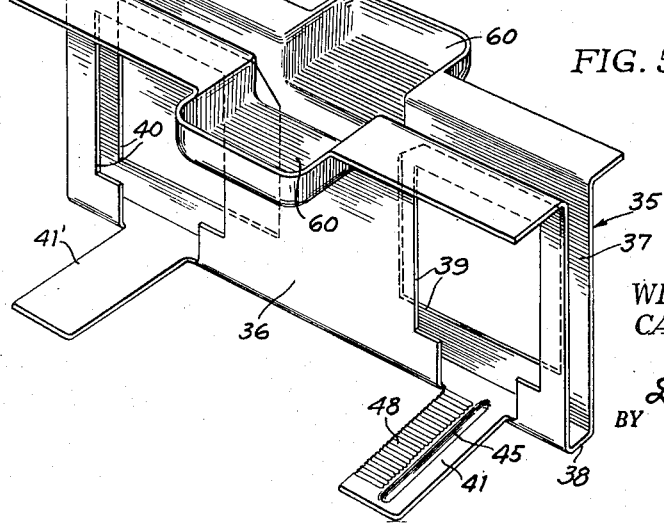
WILLIAM H. HORTON
CAMERON B. ESTES
INVENTORS
ATTORNEYS

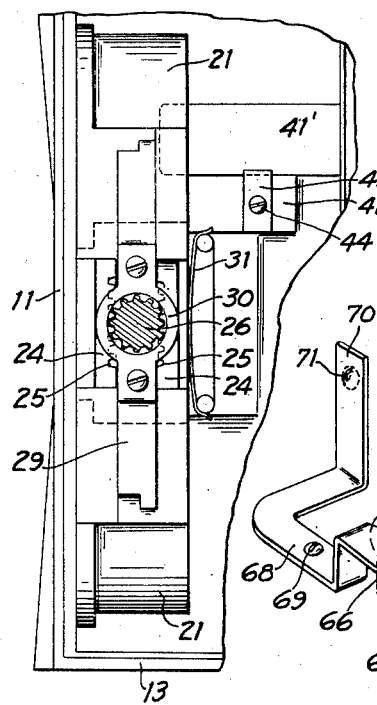
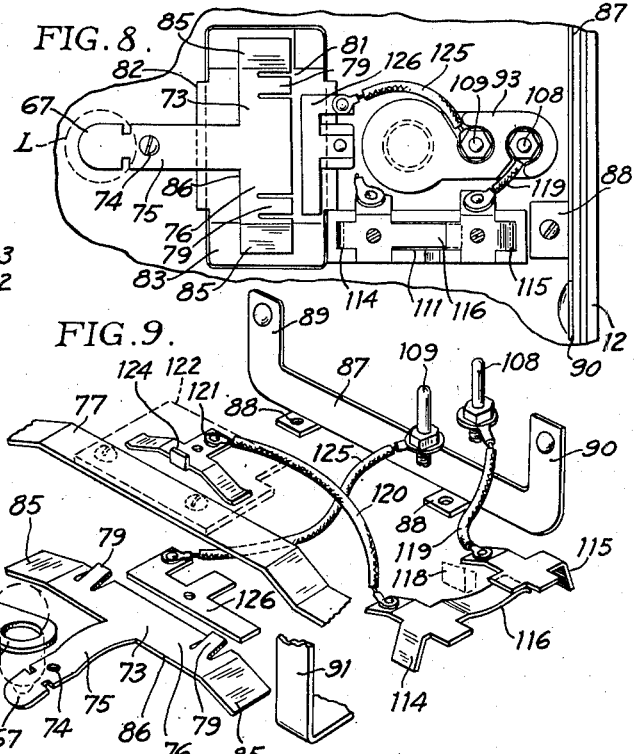
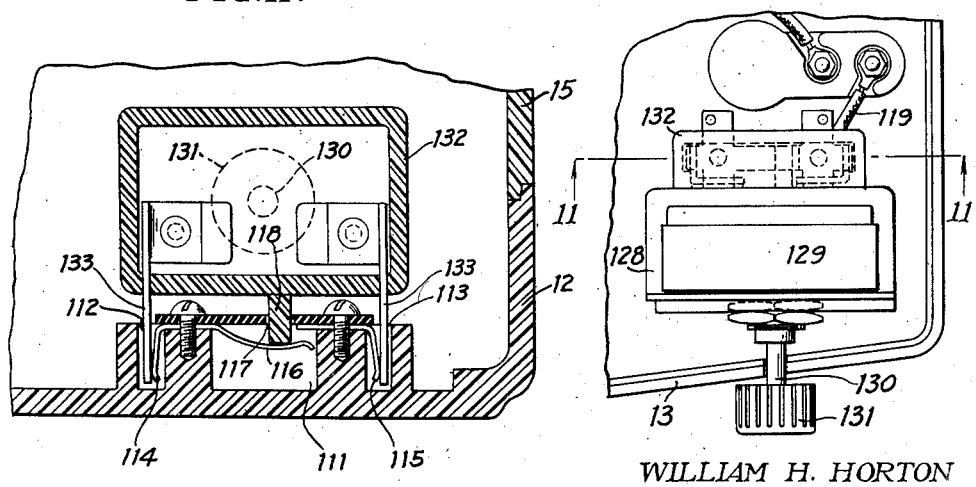
WILLIAM H. HORTON
CAMERON B. ESTES
INVENTORS

United States Patent Office 2,787,191
Patented Apr. 2, 1957

2,787,191

STEREOSCOPIC HAND VIEWER

William H. Horton and Cameron B. Estes, Rochester, N. Y., assignors to Eastman Kodak Company, Rochester, N. Y., a corporation of New Jersey Application December 8, 1953, Serial No. 396,812

5 Claims. (Cl. 88—29)

The present invention relates to a stereoscopic viewer, and particularly to a stereoscopic viewer to be used in conjunction with colored photographic transparencies mounted as stereoscopic pairs in a single slide holder.

There are many commercially available stereoscopic viewers and they vary widely in price range. Practically all of them have provision for focusing, and the majority of them move the lenses relative to the slide holder for this purpose. These viewers have the decided disadvantage that accidental pressure on the lens holders during handling of the viewer will throw the viewer out of adjusted focus. U. S. Patent 2,627,781 shows a stereoscopic viewer in which the slide holder is moved relative to the lenses for focusing purposes, but here again since the slide holder is exposed, the focus can be easily upset by accidental pressure on the slide holder during handling of the device. Some of the available viewers have means for using a battery as the source of electrical power, and others are designed for the use of line voltage. None of the so-called hand type viewers provide for the optional use of either a battery or a line voltage power supply for illuminating purposes, plus the option of controlling the line voltage supply by means of a rheostat so that the intensity of the light can be adjusted to accommodate for various color densities and for color balance in the transparencies being viewed.

The primary object of the present invention is to provide a stereoscopic viewer of the type which is portable and can be used in the hand or passed hand to hand, and commonly referred to as a hand viewer, and in which the focusing is accomplished by moving the slide holder relative to the viewing lenses; the slide holder being wholly confined within the casing so that the focus adjustment cannot be upset by accidental pressure on the slide holder during handling of the viewer.

A further object is to provide a hand stereoscopic viewer in which a battery-powered lamp or a line voltage-powered lamp can be optionally used.

And another object is to provide a viewer of the type described in which a rheostat can be readily introduced into the line voltage circuit so that the intensity of the light can be readily adjusted.

And yet another object is to provide a focusing mechanism for the viewer which is very inexpensive and simple to manufacture and assemble despite the fact that positive and critical focusing adjustment can be accomplished thereby.

And still another object is to provide a hand viewer having both a low voltage lamp circuit and a line voltage lamp circuit, the switches of each being so arranged as to be operated simultaneously by a manually operated button available from the outside of the casing.

The novel features that we consider characteristic of our invention are set forth with particularity in the appended claims. The invention itself, however, both as to its organization and its method of operation, together with additional objects and advantages thereof, will best be understood from the following description when read in connection with the accompanying drawings in which, Fig. 1 is a top plan view, with the cover partially broken away, and partly in section, of a hand viewer constructed in accordance with a preferred embodiment of the present invention;

Fig. 4 is a transverse section of the viewer taken substantially on line 4—4 of Fig. 2;

Fig. 5 is an enlarged perspective of the slide holder;

Fig. 6 is an enlarged sectional detail taken substantially on line 2—2 of Fig. 1, and showing how a line voltage socket and lamp cord assembly can be placed in the viewer for purposes of illumination;

Fig. 7 is a top plan view of the forward end of the viewer taken substantially on line 7—7 of Fig. 2 and showing the interocular adjusting mechanism for the viewing lenses;

Fig. 8 is a plan view of the bottom of the rear end of the viewer and showing that part of the battery and line voltage circuits including the switches for each and how they are operated by a single push button from the outside of the casing;

Fig. 9 is an enlarged exploded perspective showing the relation of the parts making up the two different lamp circuits;

Figure 1:
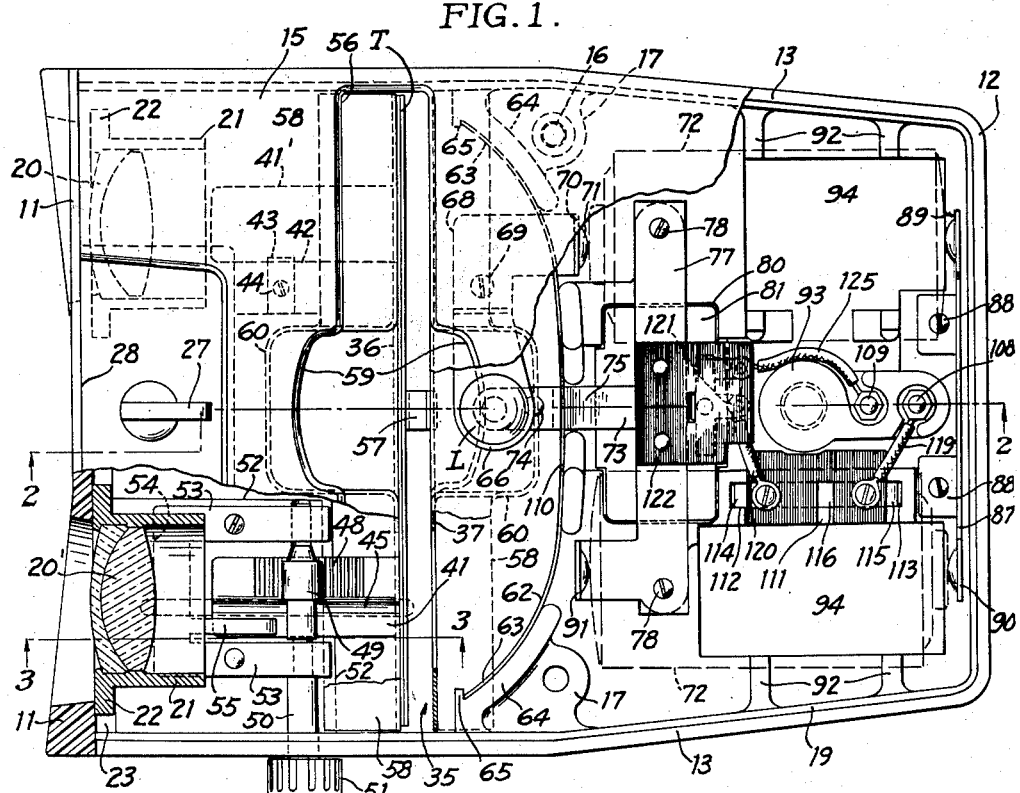

Fig. 10 is a plan view of the rear corner of the viewer with the cover removed, and showing how a rheostat can be placed in the casing in place of one of the batteries and at the same time be electrically connected into the line voltage circuit; and Fig. 11 is an enlarged sectional detail taken substantially on line 11—11 of Fig. 10 and showing how the rheostat is electrically connected into the line voltage circuit.

In general, the present stereoscopic viewer comprises a casing, including a removable cover, and in the front wall of which there are mounted two ocularly spaced viewing lenses. Wholly confined within the casing, and axially movable in the casing relative to the lenses for focusing purposes, is a slide holder. The cover is provided with a transverse slot through which a stereo transparency is adapted to be slipped into, and removed from, the slide holder. Focusing is readily and accurately accomplished by adjustment of a knob extending through the side wall of the casing. For illuminating the transparency by diffused light, a reflector is supported in the casing behind the slide holder and light from an electric lamp situated between the slide holder and the reflector is reflected to the rear of the slide holder to illuminate the transparency from behind. Means are provided for optionally using a low voltage lamp powered by batteries or a high voltage lamp powered by line voltage. Means are also provided for using the line voltage lamp with intensity control by placing a rheostat in the casing in place of one of the batteries and in such a way that it is automatically connected into the line voltage circuit. The switches for both circuits are arranged so that they will be simultaneously operated by one and the same push button so that only one button is needed to control both circuits. A latch is also provided for selectively holding the switch button depressed to a switch operating position if continuous illumination is desired.

A stereo transparency used in a viewer of this type is known to consist of an opaque mount having two spaced windows in covering relation with which two photographic transparencies of the same scene are held. One of the views is that taken from a right eye viewpoint while the other is that taken from the left eye viewpoint. The mounts in which these right and left eye views are supported take many different forms, and their specific construction is not important to the present invention. Therefore, throughout the present specification and claims, for the purpose of brevity, we will refer to the right and left eye views of a subject along with the slide mounting therefor as a transparency.

Referring now to the drawings, the stereoscopic viewer of the present invention comprises a substantially rectangular casing 10 made of a plastic or other insulating material having a front wall 11, a rear wall 12, two side walls 13, and a bottom wall 14. This casing is adapted to be closed by a cover 15 which is detachably connected to the casing by a pair of bolts, one shown at 16 in Fig. 1, which extend through holes in the top wall of the cover and thread into tapped bosses 17 provided in the bottom wall of the casing. As clearly shown in Fig. 2, the front wall 11 of the casing extends all the way to the top, and is recessed between the viewing lenses, as shown at 18, in order to accommodate the viewer's nose, whereas the rear wall and side walls of the casing extend upwardly only part way and are completed by portions of the side walls and rear walls of the cover which meet them in a rabbeted joint 19.

As shown in Fig. 1, the upper portion of the front wall is slightly concave to better fit the facial contour of the user. Behind laterally spaced openings in the front wall are disposed a pair of ocularly spaced viewing lenses 20 and 20' each mounted in a plastic tube 21 terminating in a flange 22 engaging a groove 23 in the front wall which is longer than the diameter of the flange to permit interocular adjustment of the lenses without permitting light to enter or leave the casing. Molded integrally with each of the lens tubes is an arm 24 having teeth 25 in one edge thereof to form a rack. The right and left eye lens tubes are so designed that the racks thereon are spaced apart so that a pinion 26 will lie between, and engage, the two. This pinion has fixed thereto a handle 27 which extends through an opening in a rearwardly extending overhang 28 on the front wall. By swinging this handle 27 back and forth, the viewing lenses are moved together or apart simultaneously in order to vary the interocular separation to accommodate a particular user.

As shown in Fig. 7, the lens tubes 21 are held down by a strap 29 including a circular portion 30 embracing the pinion and fastened to the extension of the front wall of the casing by a pair of screws. The rearmost arm of the lens tubes is engaged by a bowed spring 31 which holds the same in engagement with the pinion while allowing the same to slide back and forth. The pinion 26 is held down by a plate 32 engaging a flange 33 on the pinion, said plate being held in place on the overhang of the front wall by any suitable means, such as screws or clenching fingers, not shown, see Figs. 2 and 7.

Figure 2:
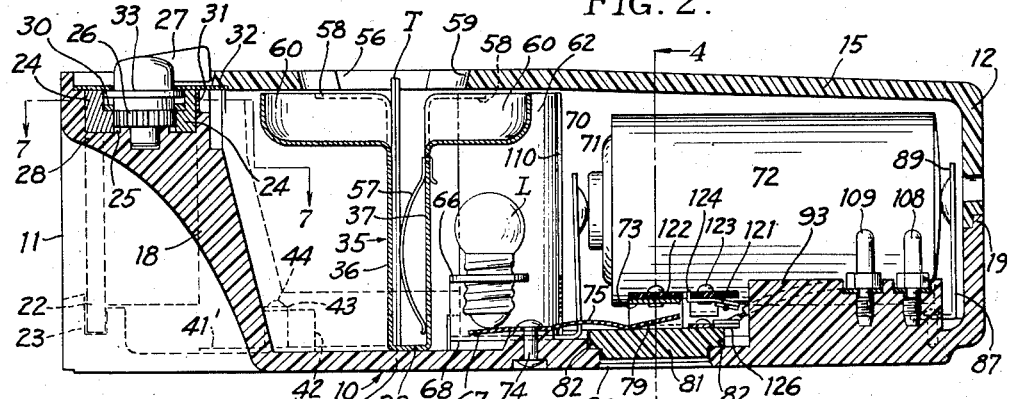
Fig. 2 is a sectional view taken substantially on line 2—2 of Fig. 1, and with one battery shown in position.

Slidably mounted wholly within the casing 10 is a transparency holder 35 of the form best shown in Fig. 5. This holder is preferably made as a stamping from thin metal and includes front and rear walls 36 and 37, respectively, held in separated parallel relation by a bottom wall 38. The front and rear walls are each provided with a pair of ocularly spaced windows 39 and 40 in alignment with which the right and left hand views of a transparency are adapted to be situated when a transparency is slipped into the top open end of the holder, as indicated in Fig. 2. As clearly shown in Fig. 1, the holder is of such length that its ends practically touch the side walls of the casing. Inasmuch as this dimension is substantially equal to the length of the transparency, when a transparency is slipped into the holder its two views must be properly aligned with the windows in the holder.

Figure 3:
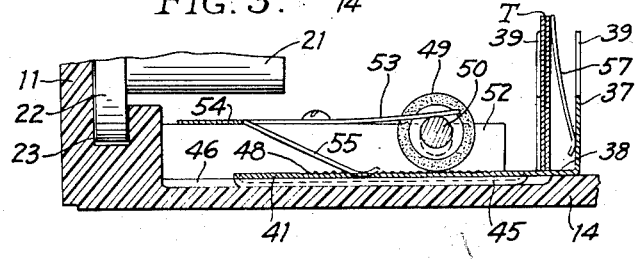
Fig. 3 is an enlarged sectional detail taken substantially on line 3—3 of Fig. 1, and showing a part of the focusing mechanism.

The holder is held erect in the casing by a pair of forwardly extending arms 41 and 41', and which, in this instance, are stamped out of the front wall and are turned downwardly at right angles thereto to slidably engage the bottom wall of the casing. For properly guiding the holder during its sliding movement in the casing for focusing purposes, the inner edge of arm 41' abuts against a rail 42 formed up in the bottom 14 of the casing, see Fig. 7. This arm is also held down by a metal strip 43 fastened to the top of the rail 42 by a screw 44, said strip extending into overhanging relation with the arm. Also for guiding purposes, the other arm 41 of the holder is provided with an elongated rib 45 depressed therefrom and which rib engages an elongated recess 46 molded into the bottom wall of the casing, see Figs. 3 and 5.

Focusing of this device is accomplished by moving the holder and the transparency T carried thereby to and from the viewing lenses. To this end, the top of the arm 41 is provided with a row of serrations 48 which are engaged by a rubber roller 49 mounted on the end of a shaft 50 extending through the side wall of the casing and having an adjusting knob 51 attached to the end thereof. The rubber roller 49 is pressed down against the serrated surface of arm 41 and the shaft is held in U-shaped bearing blocks 52 extending up from the bottom of the casing, by two spaced spring arms 53 of a U-shaped metal plate 54 attached to the bearing blocks or other bosses, extending upwardly from the bottom wall of the casing, said spring arms pressing down on the shaft, see Figs. 1 and 3. A third spring arm 55 extending from the U-shaped metal plate 54 rests on the smooth portion of arm 41 and acts to hold this arm down against the bottom of the casing. It will be appreciated that this rubber roller 49 and the serrations 48 could be replaced by a pinion and rack combination if a more expensive construction was in order. Inasmuch as the transparency holder is wholly confined within the casing, it will be apparent that the focus adjustment of the viewer cannot be accidentally upset by pressure on the lenses or slide holder while handling the viewer. This is a desirable feature not found in any hand viewer of which applicants are aware.

As clearly shown in Figs. 1 and 2, the cover 15 is provided with a transverse slot 56 through which a transparency T may be inserted into, and removed from, the holder 35. In Fig. 2, the transparency T is shown in the holder, where it is held against the front wall 36 by a bowed spring 57, and it will be seen that the transparency extends into the slot 56 but not quite through it to the outside of the cover. In order to accommodate the full focusing movement of the slide holder, the transverse slot 56 must be of substantial width. In order to prevent light from leaking in or out of the casing through this slot during focusing, the top edge of the front and rear walls of the holder are provided with light baffles 58. These baffles pass under the lower side of the cover at each side of the slot and are wide enough so that they will underlie the edge of the slot even when the holder is at either of its extreme focusing positions. To facilitate the user grasping the top edge of the transparency with the fingers to remove the same from the holder, the edges of the slot 56 at the center are cut out, as shown at 59 in Fig. 1, to form openings into which the thumb and forefinger may be inserted. At corresponding points the light baffles 58 of the holder are drawn down to form finger recesses 60, it being noted that the edge of the front and rear walls are cut out at these points to allow one to grip the top edge of the transparency T between two fingers. It is also pointed out that the finger recesses 60 in the light baffles 58 extend further back than the baffles proper. This is to take care of the increased width of the slot 56 at the cut-out areas 59.

In this viewer the transparency is illuminated from behind by diffuse illumination emanating from an electric lamp. To this end a reflector 62 is formed in spaced relation to the rear of the holder by a sheet of thin plastic material having its ends 63 confined by curved bosses 64 extending upwardly from the bottom wall of the casing and terminating in ears 65 which engage the extreme ends thereof. To provide the necessary diffused light, this reflector may have its surface painted with a flat white paint or a plastic sheet may be given this desired light diffusing property during its manufacture. An electric lamp is adapted to be disposed between this reflector and the transparency holder 35 in such a way that direct rays from the lamp will not come through the transparency to the viewing lenses, but the transparency will be evenly illuminated by diffuse light reflected from the reflector. To this end the lamp is located close to the holder and behind the opaque portion thereof between the two sets of windows 39 and 40 therein. Provision is made for selectively using a low voltage battery powered lamp L (Figs. 1 and 2), or a line voltage lamp L' (Fig. 6) as the source of illumination, and these two systems will now be described. For using a low voltage lamp powered by batteries, the following circuit is provided. A 3-volt miniature screw base lamp L is adapted to be positioned in a socket including a metal ring 66 into which the threaded shell of the lamp is to be screwed, and a base contact 67 which engages the base contact of the lamp, see Figs. 2 and 9. The metal ring 66 is formed on one end of a metal strap 68 fixed to the bottom of the casing at 69 and terminating in a vertical support 70 having a dimple 71 adapted to engage one end of a "D" size battery 72. This vertical support 70 constitutes one battery terminal and lies in that part of the casing to the rear of the line reflector and which may be called a battery compartment. The base contact 67 constitutes one end of the leg of a T-shaped contact strip 73 fastened to the bottom of the casing by rivet 74. That portion of the leg of the T-shaped strip extending into the rear or battery compartment is bowed, as shown at 75 in Figs. 2 and 9, so that the normal tendency of the cross arm 76 of the T is to move downwardly toward the bottom of the casing. The cross arm 76 constitutes the movable contact of a switch for controlling the battery circuit, the other, and stationary, contact of which comprises a contact strap 77 extending transversely of the rear compartment directly above the cross arm 76 and having its ends fastened to the bottom of the casing by screws 78. That portion of the strap 77 directly over the cross arm 76 is offset away from the bottom of the casing and is adapted to be engaged by turned-up ears 79 on the cross arm 76 when the latter is pushed up to close the switch.

Loosely mounted in an opening 80 in the bottom of the casing is a push button 81 which is used for closing the lamp circuits. As clearly shown in Figs. 2 and 6, this push button has flanges 82 overhanging the edges of the opening 80 to prevent the same from falling from the casing but permitting the button to be pushed inwardly. As shown in Fig. 4, the longitudinal cross section of this button shows tapered sides 83 joined by a horizontal surface 84. The cross arm 76 of the T-shaped strip 73 is formed to have inclined ends 85 joined by a straight portion 86 so that it will engage the irregular top surface of the push button. So shaping the upper surface of the push button 81 and the cross arm 76 provides that the button will be held against shifting laterally of the cross arm without being permanently fixed thereto. The inherent resiliency in the bowed portion 75 of the leg of the T-shaped contact strip 73 is relied upon to move the push button 81 to a switch opening position, and is overcome by inward pressure on the push button to move turned-up ears 79 on the cross arm 76 into engagement with the offset portion of strap 77 to close the battery circuit. The remainder of the battery circuit includes a U-shaped contact strap 87 fastened to the bottom of the casing at points 88 and the upstanding arms 89 and 90 thereof constitute battery terminals. The last battery terminal 91 is formed on the end of metal contact strap 77. As clearly shown, one battery is adapted to be positioned between two terminals 70 and 89, while the other battery is adapted to be positioned between terminals 90 and 91, the batteries, of course, being reversed to connect them in series relation in the circuit. As is obvious, the battery terminals provide physical supports to hold the batteries against longitudinal movement. For holding the batteries against transverse motion, the joining edge of the side wall and bottom wall have shaped ribs 92 molded therein and the center of the bottom wall has an elevated block 93, said ribs and block being adapted to engage the periphery of the batteries and between them from battery seats indicated at 94 in Fig. 1.

When using battery illumination, all that is necessary for the user to do in order to view a transparency is to place the viewer to the eyes and depress the push button 81 to close the circuit. In so doing he moves the cross arm 76 toward the stationary contact strap 77 until the turned-up ears 79 on the former engage the strap and close the circuit. Upon release of the push button, the inherent resiliency in the bowed portion 75 of the T-shaped contact strip 73 moves the button 81 and the cross arm 76 away from the contact strap 77 and to a switch open position. If it is desired to hold the push button 81 in a depressed, switch-closing position, it is only necessary to depress the button and then slide the latch 95, slidably mounted on a pin 96 in a recess 97 in the bottom wall of the casing, into overhanging relation with the button as shown in Fig. 4.

This viewer is also adapted for use with line voltage illumination, and the circuit therefor is so arranged as to be controlled by the same switch button as is used to control the battery circuit. Also, means are provided for either operating the line voltage circuit at fixed voltage all of the time or for varying the voltage so that the intensity of the lamp can be varied to suit the particular transparency being observed.

To this end, a cord assembly is provided which includes a socket 100 adapted to receive a 6-watt, 100-volt candelabra screw base lamp L'. One wire 101 of the cord 102 which goes to a wall plug is connected directly to the shell 103 of the socket. The other wire 104 of the cord is interrupted and is connected to one female contact 105 in the socket wall, while a second female contact 106 in the socket wall is connected by wire 99 to the base contact 107 of the lamp socket. This lamp socket and its lamp are mechanically supported in the casing when the two female contacts 105 and 106 are slipped onto two terminal posts 108 and 109 extending upwardly from the raised block 93 in the center of the bottom wall of the casing. When the socket 100 is placed in the casing, the neck of lamp L' therein extends through a notch 110 in the reflector and the lamp filament will lie in approximately the same position as that of the low voltage lamp when the latter is in its socket. It will be understood that in order to use the line voltage cord assembly, the low voltage lamp L must be removed from its socket 66 inasmuch as the two occupy the same position between the transparency holder and the reflector.

Next to the raised block 93 in the center of the bottom wall of the casing there is a shorted electrical outlet 111 having the usual two prong receptacles 112 and 113 into which a two prong plug is to be inserted. As shown in Fig. 9, this outlet includes two contacts 114 and 115 which extend into opposite ones of the receptacles to frictionally engage the prongs of an electrical plug inserted therein. The contact 114 includes a resilient extension 116 adapted to normally engage a projection on the contact 115 and thereby short the outlet when no plug is inserted therein. This outlet is also provided with a central opening 117 into which a third projection 118 of insulating material on a plug may extend when the plug is placed in the receptacle, said projection at this time pressing down on the extension 116 to unshort the outlet.

Contact 115 of the outlet is electrically connected to the terminal post 108 by wire 119, while contact 114 is connected by wire 120 to a switch contact 121. Switch contact 121 is fixed to an insulating block 122 by rivet 123, and an ear 124 turned up therefrom enters an aperture in the block to prevent the contact from pivoting about its rivet. This insulating block 122 is in turn fixed to the contact strap 77 of the battery circuit so that the switch contact 121 is held in approximately the same plane as the horizontal portion of the strap 77 and is insulated from the battery circuit by said block. The second terminal post 109 is connected by wire 125 to a second switch contact 126 riveted to the push button 81 beside, and in spaced relation to, the switch contact 76 of the battery circuit. Accordingly, when the push button 81 is depressed to close the switch of the battery circuit, it also moves switch contact 126 into engagement with switch contact 121 to close the line voltage circuit and light the lamp L' therein. Closing both circuits simultaneously is not detrimental because when the battery circuit is being used, the cord assembly is not in place and the line voltage circuit is incomplete, and when the line voltage lamp is being used, the low voltage lamp L is out of the circuit and the battery circuit is open at its empty socket. There are decided advantages in arranging the two circuits so that they can be controlled by the same push button 81. First, such an arrangement makes for a simple construction in that the duplication of parts is avoided. Secondly, it eliminates the necessity of the user having to feel around for, or remember to operate, different push buttons for the two different circuits depending upon which is being used.

When color transparencies are being viewed, it is often desirable to be able to adjust the intensity of the illumination in accordance with the color balance and/or density of the picture. This feature is made available to users of the present viewer in the following manner. We have designed a rheostat, indicated generally at 128, which can be plugged into the shorted outlet 111 in the casing and be connected into the line voltage circuit so as to control the voltage therein and hence the intensity of the lamp L'. Electrically this rheostat is conventional in that it includes an arcuate winding and rotatable wiper contact which is moved over the winding by a rotatable shaft, and since these parts are conventional, they have not been shown in the drawing.

The essential distinctions in this rheostat over conventional ones are found in the physical dimensions of the same which permit it to be inserted in one of the battery seats 94 in place of a battery and to rest on the top of the outlet 111, plus the provision of electrical prongs and an insulated projection 118 which enter the openings in the outlet to electrically connect the rheostat into the line voltage circuit and unshort the outlet at the same time. As clearly shown in Figs. 10 and 11, this rheostat comprises a casing preferably made of a plastic insulating material which includes a cylindrical part 129 adapted to rest in the battery seat 94 of the casing in place of a battery. In this cylindrical part is housed the conventional resistance winding and rotatable wiper contact, not shown, the position of the wiper contact being controlled by a rotatable shaft 130 which extends to the outside of the casing and includes an adjusting knob 131 on the end thereof. At the back of the cylindrical part of the rheostat case there is a substantially rectangular terminal box 132 which is adapted to rest on the top of the outlet 111. Extending through the bottom of the terminal box 132 is a pair of prong contacts 133, one of which is electrically connected to the winding of the rheostat and the other of which is connected to the wiper contact of the rheostat. These prongs contacts are adapted to enter the receptacles 112 and 113 of the outlet and engage contacts 114 and 115 to electrically connect the rheostat into the line voltage circuit. Extending from the lower side of the terminal box 132 is a projection 118 which is adapted to enter opening 117 in the receptacle where it engages resilient extension 116 of contact 114 and depresses it away from contact 115 to unshort the outlet. The prong contacts 133 along with projection 118 also serve to physically support the rheostat in the casing when inserted into their respective receptacles and opening in the outlet.

By way of summary, if one desires to use line voltage illumination instead of battery illumination, he first removes the cover 15 from the viewer and then takes the low voltage lamp L' from its socket 66. The socket 100 of the cord assembly is then slipped onto the terminal posts 108 and 109 whereupon a lamp L' will be positioned between the slide holder 35 and reflector 62 and will be electrically connected into circuit controlled by push button 81. In the event intensity control of the lamp L' is desired, the rheostat 128 is plugged into outlet 111 and takes a position in the casing normally assumed by one of the batteries. When the rheostat is plugged into the outlet 11, it is not only physically supported in the casing by such connection but is also electrically connected into the line voltage circuit so that adjustment of its knob 131 will vary the voltage on the lamp L'.

Although we have shown and described certain specific embodiments of our invention, we are fully aware that many modifications thereof are possible. Our invention, therefore, is not to be restricted to the precise details of construction shown and described but is intended to cover all modifications coming within the scope of the appended claims.

Having thus described our invention, what we claim is new and desire to secure by Letters Patent of the United States is:

1. A stereoscopic viewer comprising in combination a casing, a cover for the casing, a pair of ocularly spaced viewing lenses in the front wall of said casing, a reflector extending laterally across said casing between its front and rear walls to divide it into a viewing compartment and a rear compartment, a transparency holder disposed between said lenses and said reflector and slidably mounted wholly within said viewing compartment for focusing purposes, means for mounting an electric lamp between said holder and reflector and electrically connecting it to a source of line voltage and including a pair of terminal pins in said rear compartment, a cord assembly comprising a lamp socket having two female connectors adapted to slip onto said terminal pins and be supported thereby so that a lamp in said socket will extend past said reflector to a point between the same and said holder, one wire of the supply cord interrupted by said terminal pins and the other going directly to one terminal of the socket, a normally open switch, a direct connection between one of said terminal pins and one contact of the switch, a normally shorted electrical outlet mounted in the base of said rear compartment, one terminal of said outlet connected to the second of said terminal pins, and the other terminal connected to the second side of said switch, and a manually operated member extending to the outside of said casing for closing said switch.

2. A stereoscopic viewer according to claim 1, and including a latch movably mounted on the outside of said casing and movable between an inoperative position and an operative position in which it holds said switch operating member in a switch closing position.

3. A stereoscopic viewer according to claim 1, in which said electrical outlet, in addition to having the two customary female terminals, has an opening through which a projection may extend to engage and move one of the shorting connectors to an open circuit position, a rheostat having its winding and adjustable contact connected to opposite ones of two male connectors extending therefrom adapted to engage the female terminals in the outlet to both mechanically support the rheostat in position in the casing and to electrically connect the rheostat into said lamp circuit, and a projection of insulating material projecting from said rheostat casing to extend into said opening in the outlet and unshort the same when the rheostat is placed in said outlet, and an adjusting shaft on said rheostat extending to the outside of said casing so that the intensity of illumination can be manually adjusted at the option of the person viewing a transparency.

4. A stereoscopic viewer comprising in combination a casing, a cover for said casing, a pair of ocularly spaced viewing lenses in the front wall of said casing, a reflector extending laterally across said casing between its front and rear walls to divide it into a front viewing compartment and a rear battery compartment, a transparency holder disposed between said lenses and reflector and slidable relative to said lenses for focusing purposes, said cover provided with a transverse slot to permit a transparency to be slid into and removed from said holder, means for selectively illuminating said reflector from the side facing said transparency holder with a low voltage lamp powered from batteries and a high voltage lamp powered from line voltage, and comprising means in said battery compartment for supporting a pair of "D" size batteries and including recesses in the bottom wall for seating said batteries on their side, means for connecting said batteries in series with said socket and including four terminal posts for engaging the end contacts of said batteries and mechanically support the batteries as to longitudinal movement, two of said terminal posts electrically connected together, a third terminal post electrically connected to said socket, the fourth terminal post electrically connected to a fixed metal strap extending transversely of the casing and constituting one contact of a switch for the battery circuit, a contact strap forming the base member of said socket and the second contact of said switch, the switch contact portion of said strap deformed to normally move away from said first switch contact and to a switch opening position, a socket and cord assembly for use on line voltage adapted for use in the viewer and including a socket, a pair of connecting terminals interrupting one of the feed lines of the power cord, a pair of connecting terminals in said battery compartment adapted to mechanically and electrically cooperate with the pair on the socket to mechanically support the socket in said casing so a lamp inserted therein will lie in the position normally assumed by the low voltage lamp, a normally shorted electrical outlet in said battery compartment adjacent one of the battery recesses, one terminal of said outlet electrically connected to one of the connecting terminals in said battery compartment, the other terminal of said outlet electrically connected to a fixed contact of a second switch, the second of said connecting terminals in said compartment electrically connected to a movable contact of said second switch, a manually operated button accessible from the outside of said casing for closing both of said switches simultaneously, said button normally moved to an inoperative position by the inherent resiliency of the movable contact of said first switch and the movable contact of said second switch fixed to said button to move therewith.

5. A stereoscopic viewer according to claim 4, and including a rheostat having a pair of prong terminals connected to its winding and wiping contact and adapted to mechanically and electrically engage the terminals of said electrical outlet to support the rheostat in said compartment and connect it into the circuit of said line voltage lamp socket, an insulated projection on said rheostat casing extending into said outlet to unshort the same when the rheostat is plugged into said outlet, and the adjusting shaft of said rheostat extending to the outside of said casing to permit adjustment of the intensity of the lamp as desired.

References Cited in the file of this patent

UNITED STATES PATENTS

| | | |
|---|---|---|
| 2,484,591 | Rochwite | Oct. 11, 1949 |
| 2,516,270 | Swain | July 25, 1950 |
| 2,520,432 | Robertson | Aug. 29, 1950 |
| 2,627,781 | Welborn | Feb. 10, 1953 |
| 2,649,837 | Wiese | Aug. 25, 1953 |
| 2,666,359 | Collins | Jan. 19, 1954 |
| 2,666,360 | Collins | Jan. 19, 1954 |